United States Patent [19]
Ellis et al.

[11] 3,887,574
[45] June 3, 1975

[54] CARBOXAMIDO TETRAZOLO CHROMONES

[75] Inventors: Gwynn Pennant Ellis, Cardiff; Mervyn Evan Peel, London, both of England

[73] Assignee: Allen & Hanburys Limited, London, England

[22] Filed: Sept. 29, 1972

[21] Appl. No.: 293,578

[30] Foreign Application Priority Data
Oct. 8, 1971   United Kingdom............... 46937/71

[52] U.S. Cl.................260/308 D; 260/247.2 A; 260/247.7 A; 260/247.7 G; 260/268 PC; 260/268 H; 260/293.55; 260/293.58; 260/293.59; 260/309.2; 260/312; 260/326 A; 260/335; 260/345.5; 260/377; 260/553 R; 424/250; 424/269; 424/283
[51] Int. Cl............................................ C07d 55/56
[58] Field of Search................ 260/308 D, 268 TR

[56] References Cited
UNITED STATES PATENTS
3,427,324  2/1969  Fitzmaurice................. 260/343.2 R
3,636,004  1/1972  Bode et al...................... 260/308 D
3,706,768  12/1972  Bays.............................. 260/308 D
3,755,319  8/1973  Bays.............................. 260/308 D OTHER PUBLICATIONS
Juby et al., J. Med. Chem., Vol. 11, pp. 111–117 (1968) RS 1J5.
Juby et al. II, J. Med. Chem., Vol. 12, pp. 396–401 (1969) RS 1J5.
Graeff, Essays In Biochemistry, (John Wile & Sons, Inc., N.Y., 1956) pp. 153–154.

Primary Examiner—Donald G. Daus
Assistant Examiner—David E. Wheeler
Attorney, Agent, or Firm—Bacon & Thomas

[57] ABSTRACT
Compounds of the general formula:

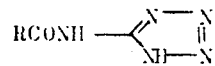

in which R is a chromone, xanthone or anthraquinone group.

These compounds inhibit release of spasmogen mediators from antigen-antibody reactions.

12 Claims, No Drawings

CARBOXAMIDO TETRAZOLO CHROMONES

This invention relates to novel heterocyclic compounds, to a process for the preparation thereof, and to compositions containing such compounds. The invention relates in particular to compounds which contain a carboxamidotetrazole group and a chromone, xanthone or anthraquinone nucleus.

We have found that certain compounds have useful pharmacological activity and, in particular, inhibit the release of spasmogen mediators from anitgen-antibody reactions.

According to the present invention there is provided a compound of the formula I:

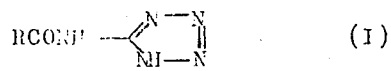
(I)

in which R is a chromone, xanthone, or anthraquinone group.

Preferably the group R is either:

A. a chromone radical of the formula II:

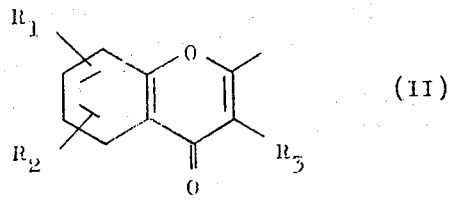
(II)

in which $R_3$, $R_1$ and $R_2$ which may be the same or different, represent a hydrogen atom, an alkyl group containing 1–6 carbon atoms, a nitro, a halogen atom or a group $NR_4R_5$ ro $OR_4$ (in which the groups $R_4$ and $R_5$ which may be the same or different each represent a hydrogen atom, or an alkyl containing 1 to 6 carbon atoms, which may optionally be substituted by an alkoxy group, a phenoxy group, a phenyl group, an amino, alkylamino or dialkylamino group or by one or more hydroxy groups or an alkoxy carbonyl group, or in which $R_4$ and $R_5$ together with the nitrogen atom can form a heterocyclic ring that may contain an additional heteroatom, for example piperidinyl, N-methylpiperazinyl or morpholino); or an aryloxy, cyano, carboxylic acid, carboxylic acid salt, carboxylic acid ester group or heterocyclic group, for example a tetrazolyl group; and in which $R_1$ and $R_2$ may together with the adjacent ring system represent a cycloalkyl group.

Particularly preferred are those compounds in which $R_1$ is a hydrogen atom, lower ($C_{1-4}$) alkyl, lower ($c_{1-4}$) alkoxy, nitro or hydroxy or cyano or tetrazolyl and $R_2$ and $R_3$ are hydrogen.

B. a xanthone radical of the formula III:

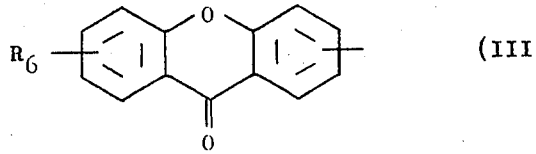
(III)

in which more than one group $R_6$ may be present in which said group(s) $R_6$ independently represent a hydrogen atom, an alkyl group containing from 1–4 carbon atoms, a nitro group, a halogen atom or a group of the formula $NR_4R_5$ or $OR_4$ and $R_4$ and $R_5$ have the meanings given in (A) above.

Particulary preferred are those compounds in which $R_6$ represents lower ($C_{1-4}$) alkoxy which may optionally contain a hydroxyl group, or hydrogen and in which the carboxamido tetrazole moiety is at the 2 or 4 position.

C. an anthraquinone radical of the formula IV:

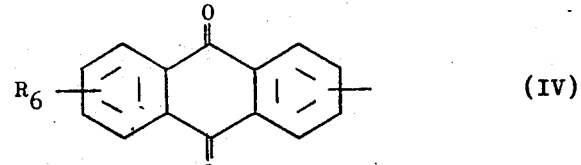
(IV)

in which more than one group $R_6$ may be present and have the meaning give in (A) and (B) above.

Particularly preferred compounds are those in which $R_6$ represents, hydrogen or an N-methyl piperazinyl group.

D. a chromone radical of the formula V:

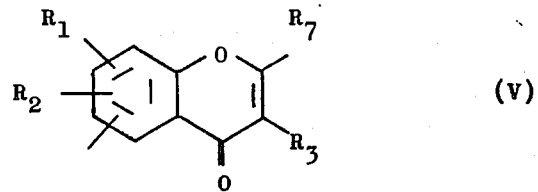
(V)

in whcih $R_7$ is a hydrogen atom, an alkyl, aryl, aralkyl or tetrazolyl group or the group $COR_8$ in which $R_8$ is a hydroxy, amino or alkoxy group or represents an amino tetrazole group VI:

(VI)

in which $R_1$–$R_3$ have the meanings given in (A) above.

Particularly preferred compounds are those in which $R_7$ is a tetrazole or a carboxamido-tetrazolyl group and in which $R_1$–$R_3$ are hydrogen.

The invention also includes pharmaceutically acceptable non-toxic salts of the above compounds such as those of the alkali metals e.g. sodium or with organic bases e.g. diethylaminoethanol. When a basic centre is also present the invention covers salts with inorganic and organic acids.

The compounds according to the invention have been shown to inhibit release of spasmogen from antigen-antibody reactions such as occur in the rat during the PCA (passive cutaneous anaphylaxis) test described by Ogilvie (Immunology, 1968, 12 (2), 113). Thus the compounds of the invention, when administered to sensitised rats, are more potent than sodium cromoglycate in inhibiting the PCA response to challenge with *Nippostrongylis brasiliensis* as antigen. These compounds are therefore likely to be of value in the treatment of conditions in which extrinsic antigen combination with a reaginic antibody is primarily responsible, for example in extrinsic asthma, hay fever, urticaria, eczema, or atopic dermatitis.

The invention also provides pharmaceutical compositions which contain a compound of general formula I or a salt thereof together with a pharmaceutically acceptable carrier, excipient, or other formulatory agent. The compositions may also contain supplementary medicinal agents, e.g. bronchodilators, anti-histamines, tranquillisers, ro anxiolytics. Suitable forms of oral administration include tablets, capsules, syrups, or emulsions. For administration by inhalation the compositions according to the invention may be in the form of a powder of snuff or as an aerosol sprat presentation. The latter may conveniently be a pressurised pack with a metering valve to deliver a fixed dosage unit or may be an aqueous solution delivered via a nebuliser.

The dosage at which the active ingredient is administered may vary within a wide range, depending on the age, weight and condition of the patient. A suitable oral dosage range is generally from 20–500 mg and for inhalation is from 0.1–20 mg. The dose may be repeated as required.

We have already described compounds having this type of pharmacological activity in a number of patent applications, that is: U.S. Ser. No. 108,581 of G. P. Ellis et al now U.S. Pat. No. 3,839,339; U.S. Ser. No. 108,580 of M. E. Peel et al; U.S. Ser. No. 164,093 of A. W. Oxford et al; U.S. Ser. No. 90,444, of David Edmund Bays, now U.S. Pat. No. 3,706,768; U.S. Ser. No. 193,971 of M. E. Peel et al.

These compounds can be generally represented by one of the formulae VII or VIII:

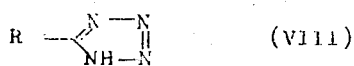

in which the group R has one of the particular meanigs defined above. In the case of these compounds it was found that the presence of the carboxylic acid or of the tetrazole grouping (or a salt thereor) was essential for activity and that conventional amide derivatives lacked activity. We have now found, most surprisingly, that these groups can be replaced by the carboxamido tetrazole group as is shown above in formula I and that the high activity may be still retained and in most cases enhanced.

Preferred compounds according to the invention include those specifically described in the Examples and also compounds in which R has one of the preferred meanings as given in the Patent Application referred to above.

The compounds according to the invention may be prepared by the acylation of 5-amino tetrazole with a compound of the formula IX:

RCOY (IX)

in which R is as defined above.

In this reaction Y is a hydroxyl group, an alkoxy group (preferably containing 1 to 6 carbon atoms), a halogen atom, or a OCO alkyl group.

The starting materials IX are either known compounds or their preparation is described in the pending applications given above.

If the compound IX is an acid halide the reaction is preferably carried out in an aprotic or aqueous medium and is also preferably carried out in the presence of an acid receptor.

When the compound IX is the carboxylic acid the reaction can be carried out using a variety of known condensing agent for example N,N'-carbonyl diimidazole or dicyclohexyl carbodiimide in an aprotic solvent.

If the compound IX is a carboxylic acid ester, the reaction with 5-amino tetrazole is preferably carried out in a high boiling solvent.

Compounds according to the invention may also be prepared from other compounds according to the invention, to vary the substituents on the group R within the meanings given above. One case of this is the conversion $R_1$=cyano to $R_1$= tetrazole by reaction with sodium azide and subsequent hydrolysis. The following Examples illustrate the invention:

EXAMPLE 1

9,10-Dihydro-9,10-dioxo-N(1H-tetrazol-5-yl)anthracene-2-carboxamide

5-Aminotetrazole (1.65 g.) in 8% aqueous sodium bicarbonate (21 mls.) was added to a solution of anthroylchloride (5 g.) in methylene chloride (80 mls.) and the mixture kept at room temperature with occasional stirring for 24 hours. The solid was filtered off, dried, and extracted with boiling dimethylformamide in a Soxhlet apparatus. The extract was filtered and after 24 hours a fawn solid (0.5 g.) crystallised from the filtrate. The solid was dissolved in aqueous alkali and then the solution acidified with dilute hydrochloric acid. The fawn solid was filtered off and dried. Crystallisation from dimethylformamide gave the required tetrazole, m.p. 308° (decomp.).

Sodium Salt

5N Sodium hydroxide was added dropwise to a suspension of the tetrazole in water until a clear solution was obtained. The addition of acetone gave the sodium salt as a brown solid, m.p. > 360°.

EXAMPLE 2

9,10-Dihydro-7-(4-Methylpiperazinyl)-9,10-Dioxo-N(1H-tetrazol-5yl)-antracene-2-carboxamide, dimethylaminoethanol salt 9,10-Dihydro-7-(4-methyl-1-piperazinyl)9,10-dioxo-2-anthroic acid, hydrochloride (1 g.) was dissolved in N-methyl pyrrolidone (100 mls.) containing triethylamine (0.4 mls.). The solution was stored over molecular sieves (BDH type 4A available from BDH Chemicals Limited) for 2 days and then filtered.

N,N'-carbonyl diimidazole (0.403 g.) was added to the filtrate and the mixture stirred for 24 hours. 5-Aminotetrazole monohydrate (0.267 g.) was then added and the mixture stirred for a further 7 days.

Ethyl acetate was added and the solid was filtered off and then triturated with hot ethyl acetate (75 mls.) to give the required tetrazole (0.497 g.), m.p. > 300°.

Dimethylaminoethanol Salt

The amidotetrazole (0.400 g.) was dissolved in a warm mixture of dimethyl formamide (15 mls.) and dimethylaminoethanol (25 mls.). Addition of ethyl acetate (60 ml.) gave the required dimethylaminoethanol salt (0.330 g.) as bright red crystals, m.p. > 300°.

EXAMPLE 3

7-(2-Hydroxyethoxy-9-oxo-N(1H-tetrazol-5-yl)xanthene-2-carboxamide

N,N'-carbonyl-diimidazole (2.1 g.) was added to 7-(2-hydroxyethoxy)-9-oxo-xanthene-2-carboxylic acid (3.9 g.) in dry dimethylformamide (120 mls.) and tetrahydrofuran (80 mls.) and the solution stirred at room temperature for 1 hour. 5-Amino-tetrazole (1.32 g.) was added and after a further 72 hours the reaction mixture was filtered, and the filtrate concentrated to approximately 20 ml. under reduced pressure. The addition of ethyl acetate gave a white solid which was filtered off and then redissolved in dimethylformamide. Ethyl acetate was added to give the required tetrazole as a white powder which was filtered off, washed with ether and dried, m.p. 285°–6° (decomp.).

Dimethylamino Ethanol Salt

The tetrazole was dissolved in the minimum quantity of dimethylaminoethanol and the solution diluted with methanol. Ethyl acetate was added until the solution went cloudy. Charcoal was added and the mixture was heated and then filtered. The addition of ethyl acetate to the filtrate gave the required salt as white microcrystals. Yield 20%.

7-Methoxy-9-oxo-N(1H-tetrazol-5-yl) xanthene-2-carboxamide, m.p. 295°–6° (decomp.) and 9-oxo-N(1H-tetrazol-5-yl) xanthene-2-carboxamide, m.p. 295°–297° (decomp.) were also prepared by this route.

EXAMPLE 4

9-Oxo-N(1H-tetrazol-5-yl)xanthene-4-carboxamide

N,N'-carbonyl-diimidazole (0.505 g.) was added to 9-oxo-xanthene-4-carboxylic acid (0.750 g.) in dimethylformamide (50 mls.) and the mixture was stirred for 20 hours. 5-Amino-tetrazole monohydrate (0.352 g.) was then added and the reaction mixture stirred for a further 6 days. The precipitate was filtered off and then triturated with a refluxing methanol (300 mls.) containing dimethylformamide (20 mls.). The mixture was cooled and the tetrazole (0.223 g.) filtered off, m.p. > 300°.

EXAMPLE 5

6-Methyl-N-(1H-tetrazol-5-YL)-4-oxochromen-2-carboximide

6-Methyl-4-oxochromen-2-carboxylic acid (5.0 g.), thionyl chloride (3.6 mls.) and dimethylformamide (0.1 mls.) in 1,2-dichloroethane (50 mls.) were heated under reflux for 4 hours, in an atmosphere or nitrogen and the solution was then concentrated under reduced pressure. The crude acid chloride in 1,2-dichloroethane (20 mls.) was added to a stirred suspension of 5-amino-tetrazole (2.1 g.) and sodium bicarbonate (3.4 g.) in icewater (30 mls.) and stirred for a further hour. The precipitate was filtered off and washed thoroughly with aqueous sodium bicarbonate. Crystallisation from dimethylformamide gave the required carboxamidotetrazole (3.4 g. 51%), m.p. 300°–301° (decomp.).

The following compounds were also prepared by a similar procedure.

N-(1H-tetrazol-5-yl)-4-oxochromen-a-carboxamide, m.p. 289°–290° (decomp.), (from ethanol-dimethylformamide) Yield 54%.

The sodium salt trihydrate was prepared by treating the tetrazole with sodium hydroxide in water followed by the addition of ethanol to precipitate it out of the solution. The precipitate was recrystallised from water, m.p. 315° (decomp.).

7-Methyl-N-(1H-tetrazol-5-yl)-4-oxochromen-2-carboxamide, m.p. 290°–291° (decomp.), (from ethanol-dimethylformamide) Yield 47%. The dimethylaminoethanol salt (m.p. 175°–185°) of this compound was prepared by a procedure similar to that described in Example 4.

6-Cyano-N-(1H-tetrazol-5-yl)-4-oxochromen-2-carboxamide, m.p. 289°–290° (decomp.), (from ethanol-dimethylformamide) Yeild 77%.

N,N'-Di(1H-tetrazol-5-yl)-4-oxochromen-2,6-dicarboxamide, m.p. > 340° (from dimethylformamide) Yield 68%.

EXAMPLE 6

7-Hydroxy-N-(1H-tetrazol-5-yl)-4-oxochromen-2-carboxamide

7-Hydroxy-chromone-2-carboxylic acid (16 g.) and 5-amino-tetrazole (7.0 g.) were dissolved in dry tetrahydrofuran and stirred for 6 hours with dicyclohexylcarbodiimide (16.3 g.). The precipitate was filtered off, boiled in ethanol and dried. Yield 10 g., m.p. 300°(decomp.), recrystallised from dimethylformamide and ethanol.

EXAMPLE 7

6-Nitro-N-(1H-tetrazol-5-yl)-4-oxochromen-2-carboxamide

Chromone-2-carboxylic acid (15 g.) was dissolved in concentrated $H_2SO_4$ (75 mls.) and nitric acid (d 1.42 9 mls.) was added in portions, the temperature being maintained at 23°–35°C. The solution was heated at 70° for 1 hour, cooled, and poured onto ice. The precipitate was filtered off and recrystallised from aqueous ethanol. Yield 13 g., m.p. 268°–269° (decomp.).

The 6-Nitro-chromone-2-carboxylic acid (6 g.) in tetrahydrofuran (306 mls.) and 5-amino-tetrazole (2.6 g.) were stirred for 6 hours with dicyclohexylcarbodiimide (7.2 g.). The white precipitate was filtered off and boiled in ethanol. Yield 4 g., m.p. ~ 290°, recrystallised from dimethylformamide/ethanol.

EXAMPLE 8

7-Methoxy-N-(1H-tetrazol-5-yl)-4-oxochromen-2-carboxamide

7-Methoxy-chromone-2-carboxylic acid (5 g.) in dimethylformamide (10 mls.) and tetrahydrofuran (300 mls.) was treated with 5-amino-tetrazole (2.3 g.) followed by dicyclohexylcarbodiimide (5.2 g.), and the mixture was stirred for 6 hours. The precipitate was filtered off and washed with hot ethanol. Yield 2.0 g., m.p. ~ 298° (decomp.), recrystallised from dimethylformamide/ethyl alcohol.

EXAMPLE 9

N,6-Di(1H-tetrazol-5-yl)-4-oxochromen-2-carboxamide a. 6-Cyano-N(1H-tetrazol-5-yl)-4-oxochromen-2-carboxamide 6-Cyano-4-oxochromen-2-carboxylic acid (6 g.) and 5-amino-tetrazole (3.0 g.) was dissolved in tetrahydrofuran (250 mls.). Dicyclohexylcarbodiimide (6.0 g.) was added and the mixture stirred for 6 hrs. The precipitate was filtered off and washed with hot ethanol (4.5 g) to remove dicyclohexylurea.

b. 6-Cyano-N(1H-tetrazol-5-yl)-4-oxochromen-2-carboxamide

6-Cyano-N(1H-tetrazol-5-yl)-4-oxochromen-2-carboxamide (4.5 g.), sodium azide (2.5 g.), and NH₄Cl (2.0 g.) were heated on a water bath with stirring for 8 hrs in dimethylformamide (80 mls.). The /NH$_{of NaN3}$/ 4Cl was filtered off while hot and dimethylformamide removed under reduced pressure. The residue was left overnight with water (200 mls.) at pH₂ and the yellow-brown precipitate was filtered off and recrystallised from dimethylformamide/ethyl alcohol. Yielld 2.0 g., m.p. > 340°.

EXAMPLE 10 a. Ethyl-2-carbamoyl-4-oxochromen-6-carboxylate

A stream of ammonia gas was passed for 30 minutes into a stirred suspension of diethyl 4-oxochromen-2,6-dicarboxylate (24 g.) in anhydrous ethanol (250 mls.) and cooled in an ice-bath. The precipitate was collected, m.p. 306°–308°.

b. Ethyl 2-cyano-4-oxochromen-6-carboxylate

Ethyl-2-carbamoyl-4-oxochromen-6-carboxylate (18 g.) was dehydrated with toluene-p-sulphonyl chloride (19.6 g.) and pyridine (18 mls) in dimethylformamide (100 mls.) by stirring and heating on an oil-bath at 80°–90° for 8 hours. The mixture was allowed to stand overnight and then poured on to water. The precipitate was separated and dried. Yield 15 g., m.p. 161°–162°.

c. 2-(1H-tetrazol-5-yl)-4-oxochromen-6-carboxylic acid

Ethyl 2-cyano-4-oxochromen-6-carboxylate (10 g.) was heated with sodium azide (3.5 g.) and NH₄Cl (2.9 g.) in dimethylformamide (80 mls.) on a water-bath for 8 hrs. NaN₃/NH₄Cl was removed by filtration, the solvent was distilled off under reduced pressure, and the residue was poured into aqueous acid. The precipitate was filtered off and hydrolysed by refluxing with glacial acetic acid (30 mls). and conc. HCl (10 mls.) for 3 hrs., m.p. 293°–294°.

d. N,2-di(1H-tetrazol-5-yl)-4-oxochromen-6-carboxamide 2-(1H-tetrazol-5-yl)-4-oxochromen-6-carboxylic acid (3 g.) was dissolved in dimethylformamide (20 mls.) and tetrahydrofuran (150 mls.) was added. 5-Aminotetrazole (1 g.) was added, followed by dicyclohexyl-carbodiimide (2.5 g.), and the mixture was stirred for 8 hours. The brown precipitate was filtered off, boiled in ethanol, and then separated. Yield 1.3 g., m.p. ~ 340°.

EXAMPLE 11

Inhalation Aerosol 1.3 mg. of the sodium salt trihydrate of N-(1H-tetrazol-5-yl)-4-oxochromen-2-carboxamide was mixed with 0.026 mg. of Emulsifier YN100 supplied by Cadbury Brothers, Bournville, England and the total weight made up to 85 mg. with propellant Arcton 11 and Arcton 12 (Arcton propellants are made by I.C.I. Limited) in amounts of 23.1 and 60.6 mg. respectively.

We claim:

1. A compound having the formula

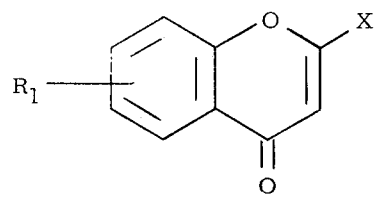

Wherein R₁ represents hydrogen, lower alky, lower alkoxy, hydroxy, cyano, nitro, carboxamidotetrazolyl, or tetrazolyl; and X is carboxamidotetrazolyl, or when R¹ is carboxamidotetrazolyl, X is tetrazolyl.

2. The compound as claimed in claim 1 in which 6-methyl-N(1H-tetrazol-5-yl)-4-oxochromen-2-carboxamide.

3. The compound as claimed in claim 1 which is N-(1H-tetrazol-5-yl)-4-oxochromen-2-carboxamide or its sodium trihydrate salt.

4. The compound as claimed in claim 1 which is 7-methyl-N-(1H-tetrazol-5-yl)-4-oxochromen-2-carboxamide.

5. The dimethylaminoethanol salt of the compound claimed in claim 4.

6. The compound as claimed in claim 1 which is 6-cyano-N-(1H-tetrazol-5-yl)-4-oxochromen-2-carboxamide.

7. The compound as claimed in claim 1 which is N,N'-Di(1H-tetrazol-5-yl)-4-oxochromen-2,6-dicarboxamide.

8. The compound as claimed in claim 1 which is 7-Hydroxy-N-(1H-tetrazol-5-yl)-4-oxochromen-2-carboxamide.

9. The compound as claimed in claim 1 which is 6-Nitro-N-(1H-tetrazol-5-yl)-4-oxochromen-2-carboxamide.

10. The compound as claimed in claim 1 which is 7-methoxy-N-(1H-tetrazol-5-yl)-4-oxochromen-2-carboxamide.

11. The compound as claimed in claim 1 which is N,-6-Di(1H-tetrazol-5-yl)-4-oxochromen-2-carboxamide.

12. The compound as claimed in claim 1 which is N,-2-Di(1H-tetrazol-5-yl)-4-oxochromen-6-carboxamide.

* * * * *